United States Patent [19]

Jensen

[11] Patent Number: 4,797,142
[45] Date of Patent: Jan. 10, 1989

[54] METHOD OF PREPARING A MELT FOR THE PRODUCTION OF MINERAL WOOL

[75] Inventor: Leif M. Jensen, Roskilde, Denmark
[73] Assignee: Rockwool International A/S, Hedehusene, Denmark
[21] Appl. No.: 143,132
[22] PCT Filed: May 14, 1987
[86] PCT No.: PCT/DK87/00056
§ 371 Date: Jan. 7, 1988
§ 102(e) Date: Jan. 7, 1988
[87] PCT Pub. No.: WO87/06926
PCT Pub. Date: Nov. 19, 1987

[30] Foreign Application Priority Data

May 14, 1986 [DK] Denmark .............. 2226/86

[51] Int. Cl.⁴ ............ C03B 37/01; C03B 37/06; C03B 5/12; F27B 1/09
[52] U.S. Cl. ................................. 65/2; 65/5; 65/19; 65/27; 65/134; 75/42; 110/341; 501/36; 501/44; 432/95; 432/195
[58] Field of Search ........... 65/2, 5, 27, 19, 134, 65/335; 75/42; 432/95, 195; 110/341; 501/36, 44

[56] References Cited

U.S. PATENT DOCUMENTS

| | | | |
|---|---|---|---|
| 2,467,889 | 4/1949 | Harter et al. | 501/36 |
| 4,093,451 | 6/1978 | Cass et al. | 75/42 X |
| 4,365,984 | 12/1982 | Gee | 65/2 |
| 4,405,723 | 9/1983 | Kainzner et al. | 501/36 |
| 4,486,211 | 12/1984 | Monaghan | 65/2 X |
| 4,617,045 | 10/1986 | Bronshtein | 65/134 |
| 4,617,046 | 10/1986 | Hals | 65/134 |

Primary Examiner—Robert L. Lindsay
Attorney, Agent, or Firm—Watson, Cole, Grindle & Watson

[57] ABSTRACT

Method of preparing a melt for the production of mineral wool wherein suitably composed raw material and coke are fed into a preheating zone in the upper portion of a shaft furnace and are caused to descend down through the oxidation zone in which air is introduced to effect a combustion of the coke and to heat the raw material to a temperature not exceeding 1000° C., and wherein the actual melting is effected by plasma heating in the lower portion of the shaft furnace where which the melt formed is discharged.

5 Claims, 1 Drawing Sheet

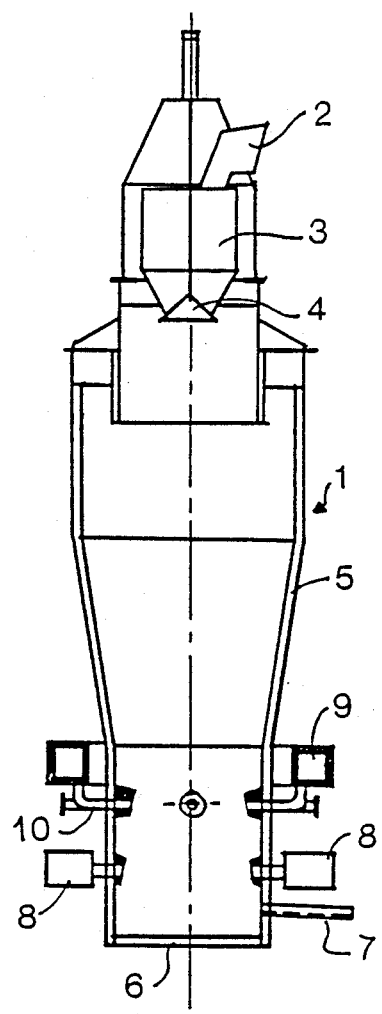

METHOD OF PREPARING A MELT FOR THE PRODUCTION OF MINERAL WOOL

The present invention relates to a method of preparing a melt for the production of mineral wool wherein a raw material having a composition suitable for the preparation of the melt and a carbonaceous material are fed into a preheating zone in the upper portion of a shaft furnace and oxygen-containing gas is introduced into an oxidation zone in the lower portion of the shaft furnace to effect a combustion of the carbonaceous material and to heat the raw material and wherein a melt is discharged from the bottom of the shaft furnace.

In the prior art methods of the above mentioned type the carbonaceous material used typically consists of coke and the oxygen-containing gas is normally oxygen-enriched air which is suitably preheated to a temperature of at least 450° C. and preferably about 500° C. A known shaft furnace type for the preparation of a melt for the production of mineral wool is a cupola furnace. Such furnace normally comprises four temperature zones, i.e. a melting bath, an oxidation zone, a reduction zone, and a preheating zone.

The lower portion of the cupola furnace constitutes the melting bath and comprises the melt formed in the cupola which melt is located in the space between the pieces of coke which are resting on the bottom of the cupola and which support the material laying thereabove. The temperature in the melting bath is typically in the range of 1500°–1550° C.

The oxidation zone is located above the melting bath and the lower portion of said zone is provided with a gas inlet nozzles, the so-called tuyeres, through which the preheated gas is introduced into the furnace. The actual combustion of the coke takes place during the movement of the preheated air up through the oxidation zone, and the gas temperature rises from about 500° C. to about 2000° C. thus causing the material which moves down through the oxidation zone to be heated to its melting point as a result of the melting of the raw material. The melt formed flows down into the melting bath where the temperature, as mentioned, typically is 1500°–1550° C. The vertical extension of the oxidation zone is determined by the amount of oxygen introduced as the reduction zone starts at the level where the oxygen introduced through the tuyeres is consumed for combustion of the coke.

In the reduction zone where the temperature range is between 1000° and 1500° C., coke reacts with the $CO_2$ formed in the oxidation zone in connection with the combustion of coke so as to form CO in an amount which is double the amount of consumed $CO_2$ based on volume.

This reaction is heat consuming and causes 20–25% of the energy released by the combustion in the oxidation zone to be lost as latent heat in the smoke gas when the CO content of the latter is 6–10%. Even though this amount of heat may be recovered by a secondary combustion, it will be desirable to avoid the formation of CO i.e. because a secondary combustion requires relatively high plant investments and the efficiency of such secondary combustion is relatively low.

The reduction i.e. the CO formation is strongly dependent on temperature in the temperature range above 1000° C. as it e.g. is increased with a factor of 10 when the temperature rises from 1000° to 1200° C. On the other hand, the reaction speed for the conversion of $CO_2$ into CO is so low at temperatures below 1000° C. that no appreciable reduction takes place in the preheating zone located above the reduction zone wherein the materials introduced at the top of the cupola are preheated from the ambient temperature to about 1000° C.

The object of the present invention is to eliminate or limit the conversion of the $CO_2$ formed during combustion into CO by a method of the type defined above.

This object is obtained with the method according to the invention, which method is characterized in that the combustion in the oxidation zone is controlled in such a manner that the temperature in the transition between the oxidation zone and the preheating zone does not exceed about 1000° C., and that the material in the zone below below the oxidation zone is heated solely by plasma heating.

The invention is based on the discovery that by effecting the final heating by means of one or more plasma arcs which heating does not involve any appreciable supply of oxygen and at the same time maintaining the combustion in the oxidation zone at the above mentioned level it can be avoided that the $CO_2$ present reacts with the carbonaceous material to form CO. In the zone wherein the material is subjected to the final heating to the desired melting temperature by means of one or more plasma arcs, the $CO_2$ content is so limited that there will be no appreciable reaction with carbon, and in the oxidation zone, where $CO_2$ is formed, oxygen is present in excessive amounts so as to exclude the formation of CO. In the preheating zone the temperature is so low that the speed of the conversion of $CO_2$ into CO is too low for the reaction to get any practical importance.

The control of the combustion in the oxidation zone with a view to obtaining the desired movement of material in said zone may be effected by adjustment of the amount of oxygen-containing gas which is introduced into the oxidation zone through the tuyeres.

The control of the combustion with a view to obtaining the desired temperature in said zone is effected by changing the carbon content, the so-called coke percentage, in the charge fed into the shaft furnace. The sensitivity of said control is relatively poor and it is known from previous practice where the coke percentage has been used to control the melting temperature that in order to change the melting temperature by 1% relatively, the coke percentage has to be changed by about 5% under the operational temperatures normally used in a known furnace.

In the present method the temperature of the melt is controlled by the plasma heating which as explained below may be adjusted within wide limits, and the heating in the oxidation zone solely serves as an intermediate heating, i.e. heating from a temperature from about 1000° C. to e.g. about 1250° C. For this purpose the temperature control obtained by adjustment of the coke percentage is satisfactory as a compensation by plasma heating may easily be made.

The plasma arc may be produced by directing a gas e.g. atmospheric air or nitrogen through a high-intensity electric field so as to cause the molecules to be initially split into atoms which by further supply of energy lose their electrons and are converted into positively charged ions. This causes such large amounts of energy to be released that temperatures of about 5000° C. can be achieved. In practice, the plasma generators consist of a tubular electrode, normally the anode, which is closed at the rear end in extension of which a corresponding open tubular electrode of opposite polarity is placed i.e. the cathode e.g. consisting of a water-cooled tungsten eller cobber. Direct current forms an electric arc between the anode and cathode and by injecting gas through the circular space between the two electrodes and out through the front electrode (normally the cathode), the electric arc is converted into a highly intensive flame which is directed towards the material to be heated.

The plasma heating offers the special advantage of making it possible to increase the melting capacity and amount of melt in a few minutes without affecting any other operational conditions of the furnace. The dependency on coke heating is also reduced and the result is that lower coke percentages may be used. It has e.g. proved possible to reduce the coke percentage from the normal 11% to as little as about 1%. This has a favourable effect on the sulphur emission from the shaft furnace as this is reduced concurrently with the reduction of the coke percentage. The amount of gas required for operating the furnace is also considerably reduced by partly replacing coke combustion with plasma heating. Thus, the required amount of air for coke combustion is about 15 times greater than the amount of gas required for plasma combustion.

The relationship between coke heating and plasma heating is adjusted in such manner that the ratio between the amounts of energy formed is from about 2:1 to about 5:1. Thus, it is particularly advantageous to provide about 30% of the energy consumption in a shaft furnace by plasma heating and the rest by coke heating.

By effecting part of the heating with plasma arcs, the gas stream through the shaft furnace is reduced and it becomes possible to charge the furnace with finer starting materials as the flow area becomes less critical. The reduced velocity of the smoke gas improves the preheating and thus the utilization of energy.

The invention will be described in further detail with reference to the drawing which shows a furnace for carrying out the method according to the invention.

The drawing shows a cupola furnace 1 having a feed hopper 2 which communicates with a vessel 3 having a bottom which is constituted by an axially displaceable cone 4. Below the vessel 3 there is a melting chamber which is enclosed by a water-cooled jacket 5. The cupola furnace 1 comprises at its lower end a plane furnace bottom 6 and in a suitable distance above the bottom 6 there is provided a melt outlet 7. A number of plasma generators are built into the furnace wall some distance above the level wherein the melt outlet 7 is placed. At a higher level there is provided an annular air inlet pipe 9 which communicates with a number of tuyeres 10.

The solid materials i.e. the raw materials having a composition corresponding to that of the desired melt and the carbonaceous material, such as coke, are fed into the melting chamber through the hopper 2 and the vessel 3, the dosage being effected by suitable adjustment of the cone 4.

The upper portion of the melting chamber acts as preheating zone as the materials are heated by the ascending smoke gasses. From the preheating zone the materials descend down through the oxidation zone of the furnace, the lower limit of which is located at the level wherein air is introduced through the tuyeres 10. Coke is combusted in the oxidation zone so as form $CO_2$. The temperature in the oxidation zone is kept at such a level that the temperature of the portion of the preheating zone located immediately above the upper end of the oxidation zone does not exceed 1000° C. so as to eliminate or considerably reduce a reaction between the $CO_2$ formed in the oxidation zone and carbon so as to form CO. The actual melting is effected in the portion of the melting chamber which is located below the oxidation zone and wherein strong heat is introduced by means of the plasma generators 8. The melt formed descends down towards the bottom of the furnace and the melt is discharged through the melt outlet 7.

I claim:

1. A method of preparing a melt for the production of mineral wool, wherein a raw material having a composition suitable for the production of the melt and a carbonaceous material are fed into a preheating zone in the upper portion of a shaft furnace and oxygen-containing gas is introduced into an oxidation zone in the lower portion of the shaft furnace to effect a combustion of the carbonaceous material and to heat the raw material, and wherein a melt is discharged from the bottom of the shaft furnace, characterized in that combustion in the oxidation zone is controlled in such a manner that the temperature in the transition between the oxidation zone and the preheating zone does not exceed about 1000° C., and that the material in the zone below the oxidation zone is heated solely by plasma heating.

2. A method according to claim 1, characterized in that the temperature in the oxidation zone is maintained at 1000°–1250° C.

3. A method according to claim 1, characterized in that the combustion in the oxidation zone and the plasma heating are controlled in such a manner that the ratio between the amount of energy formed is from about 2:1 to about 5:1.

4. A method according to claim 1, characterized in using coke as carbonaceous material.

5. A method according to claim 4, characterized in using coke in an amount of less than 11% of the raw material.

* * * * *